Nov. 14, 1944.    D. M. SMITH    2,362,673
PISTON PACKING
Filed Jan. 6, 1940
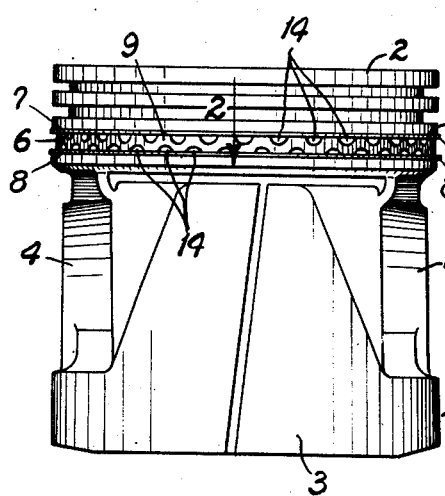
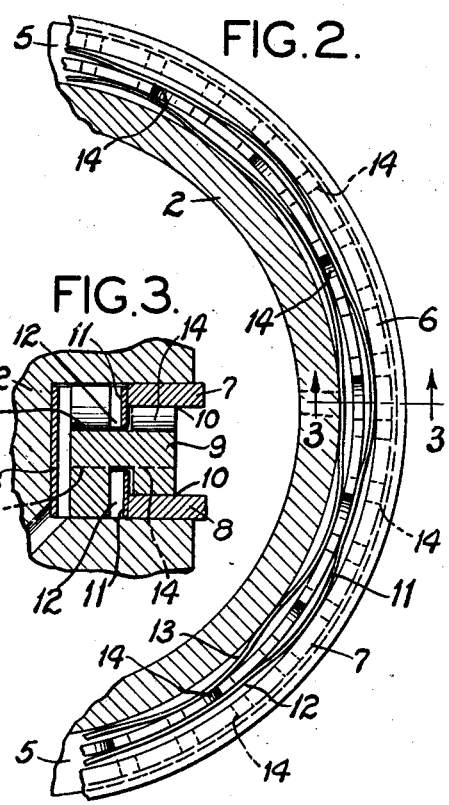
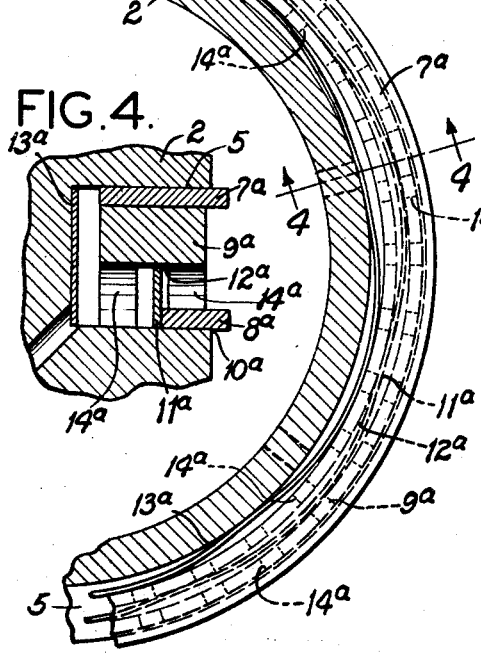
INVENTOR:
DALLAS M. SMITH
BY J. Henry Kneale
ATTORNEY Patented Nov. 14, 1944

2,362,673

UNITED STATES PATENT OFFICE 2,362,673

PISTON PACKING

Dallas M. Smith, Kirkwood, Mo.

Application January 6, 1940, Serial No. 312,757

8 Claims. (Cl. 309—45)

My invention relates to piston packings and more particularly to multiple-piece piston packings having a plurality of cylinder contacting surfaces each adapted to exert a high pressure per unit of contacting area on the cylinder wall to insure the effective removal of an adequate amount of oil from the cylinder wall as the cylinder contacting surfaces of the packing pass thereover.

My invention contemplates a piston packing to be used in a ring groove of a piston and comprising a plurality of resilient ring members adapted to contact the cylinder wall. Positioned between each pair of ring members and arranged to separate the ring members of the pair is a spacer having formed therein an auxiliary ring groove or rabbet to receive one of the ring members and which groove may be bounded by surfaces formed in the spacer and arranged to cooperate with a wall of the ring groove of the piston. Positioned between the spacer and the bottom of the ring groove of the piston is a sinuous expander adapted to exert pressure on the spacer and the ring members so that the ring members exert a high pressure per unit of contacting area on the cylinder wall. A piston packing constructed according to my invention also may be provided with an expander positioned in the auxiliary ring groove of the spacer between the bottom thereof and the ring member therein. The ring member positioned in the auxiliary ring groove of the spacer has a radial thickness substantially less than the depth of the ring groove of the piston. If the piston packing is to be used as an oil ring, the spacer may have passages arranged therein to permit oil removed from the cylinder wall by the ring member to flow therethrough into the interior of the piston.

A piston packing constructed according to my invention and as briefly described above, presents to the cylinder wall a plurality of cylinder contacting surfaces having a high pressure per unit of contacting area and which effectively remove an adequate amount of oil from the cylinder wall as the cylinder contacting surfaces pass thereover.

The ring members may expand and contract individually and, if desired, the ring members may be arranged in the ring groove under various tensions by utilizing an individual expander for each ring member.

One object of my invention, therefore, is to provide a multiple-piece piston packing having a plurality of cylinder contacting surfaces each of which may be assembled in the ring groove under various tensions.

Another object of my invention is to provide a multiple-piece piston packing which may be used as an oil ring.

A more specific object of my invention is to provide a multiple-piece piston packing which will provide an effective seal between the piston and the cylinder in which it reciprocates.

Other objects and advantages will be apparent to those skilled in the art from the following description wherein reference is made to the drawing illustrating several preferred embodiments of my invention and wherein similar reference numerals designate similar parts throughout the several views.

Several embodiments of a piston packing constructed according to my invention are shown in the drawing wherein Fig. 1 is a side elevation of a piston provided with a piston packing constructed according to my invention.

Fig. 2 is a detail section on the line 2—2 of of Fig. 1.

Fig. 3 is a section on the line 3—3 of Fig. 2.

Fig. 4 is a section on the line 4—4 of Fig. 5 and shows a second embodiment of my invention.

Fig. 5 is a detail sectional view of a second embodiment of my invention and similar to the view shown in Fig. 2.

Fig. 6 shows a detail sectional view of a third embodiment of my invention, and

Fig. 7 shows a detailed sectional view of a fourth embodiment thereof.

Referring to the figures, a piston 1 is shown therein comprising a head 2, a skirt 3, and wrist pin bosses 4. The head 2 is provided with a ring groove 5 in which is provided one embodiment of a piston packing 6 constructed according to my invention. The piston 1 constitutes no part of my invention and may be of any desired kind, as it is shown here only for illustrative purposes.

The embodiment of my invention shown in Figs. 1, 2 and 3 is comprised of a pair of split resilient ring members 7 and 8 adapted to contact the cylinder wall and formed preferably of ribbon steel. The radial thickness of the ring members 7 and 8 preferably is substantially less than the depth of the ring groove 5 of the piston 1.

Positioned between the ring members 7 and 8 and adapted to separate the ring members from each other is a spacer 9 having portions of the outer face thereof cut away preferably at the corners to form therein a pair of auxiliary ring grooves 10 arranged to cooperate with a wall of the ring groove 5 of the piston 1 and adapted to receive the ring members 7 and 8. The spacer 9 may be formed of any suitable material and has a gap between the ends thereof so that it may expand and contract radially with the ring members 7 and 8 as they pass over irregularities in the cylinder wall. Positioned in each auxiliary ring groove 10 between the bottom thereof and the rear face of the ring member positioned therein, is an expander 11 adapted to exert pressure on the ring member in order that the ring member in turn exerts a greater pressure on the cylinder wall.

Formed in the spacer 9 at the bottom of each auxiliary ring groove 10 and extending axially into the body of the spacer, as is shown clearly in Fig. 3, is a channel 12 adapted to receive an expander 11 and arranged to prevent displacement of the expander positioned therein.

Positioned in the ring groove 5 of the piston 1 between the bottom thereof and the rear face of the spacer 9 is an expander 13 adapted to exert pressure on the spacer which, in turn, exerts pressure on the ring members 7 and 8.

If the piston packing 6 as described above is to be used as an oil ring, the spacer 9 may have formed therein a plurality of passages 14 extending radially therethrough from the front face to the rear face thereof and arranged in staggered formation as shown in Fig. 1. The passages 14 may be any desired shape but preferably are arc-shaped in form so that the strength of the spacer 9 is not decreased unnecessarily. Also, the expanders 11 and 13 may have passages formed therein to permit oil removed from the cylinder wall to flow freely therethrough.

The embodiments shown in Figs. 4, 5, 6 and 7 all comprise a pair of ring members 7a and 8a adapted to contact the cylinder wall, a spacer 9a arranged to separate the ring members from each other, and an expander 13a positioned in the ring groove 5 of the piston 1 and adapted to exert pressure on the spacer 9a and the ring members 7a and 8a. However, in these embodiments the radial thickness of the ring member 8a only is substantially less than the depth of the ring groove 5 of the piston 1, and the spacer 9a has formed therein a single auxiliary ring groove 10a adapted to receive the ring member 8a. The radial thickness of the ring member 7a preferably is such that the expander 13a exerts radial pressure thereon to insure the effective removal of oil from the cylinder wall as the ring member passes thereover.

The embodiment shown in Figs. 4 and 5 is provided with an expander 11a positioned in the single auxiliary ring groove 10a of the spacer 9a and adapted to exert pressure on the ring member 8a positioned therein. Also, the spacer 9a has formed therein an axial slot 12a to prevent displacement of the expander 11a from the auxiliary ring groove 10a. If this embodiment is to be used as an oil ring, passages 14a are provided in the spacer 9a extending radially therethrough and positioned adjacent the ring member 8a.

If the embodiment shown in Fig. 6 is to be used as an oil ring, the spacer 9a has formed therein passages 14b extending radially therethrough and positioned adjacent the ring member 8a whose radial thickness is substantially less than the depth of the ring groove 5 of the piston 1.

In the embodiment shown in Fig. 7 the width of the expander 13a in the ring groove 5 is substantially less than the axial width of the ring groove 5, and the expander 13a is arranged therein to contact the spacer 9a and the ring member 7a. In order to prevent the expander 13a from shifting its position in the ring groove 5 and to maintain the expander in contact with the ring member 7a, the spacer 9a is provided with a shoulder 15a on the rear face thereof. If this embodiment is to be used as an oil ring, the spacer 9a has formed therein a plurality of passages 14c extending radially through the spacer 9a from the outer face to the inner face thereof and positioned adjacent the ring member 7a in contact with the expander 13a.

Other arrangements may be used without deviating from the scope of my invention and while I describe several constructions it is evident that they may be varied in many particulars and I do not limit myself to the forms and arrangements shown and described. For instance, oil passages of any desired shape and arranged in any desired manner may be provided in the spacer if the piston packing is to be used as an oil ring. In some instances it may be more expedient to bound the auxiliary ring groove entirely by surfaces formed in the spacer, instead of utilizing a wall of the ring groove of the piston as a bounding surface for the auxiliary groove.

Also, the ring members 7a and 8a in Figs. 4, 5, 6 and 7 may be rearranged so that the ring member 7a of larger radial thickness is at the lower side of the ring groove 5 instead of at the upper side thereof, as shown in the present embodiments, and the ring members 8a of smaller radial thickness may be positioned at the uppper side thereof.

Although I have shown a piston packing formed of a pair of ring members, it should be understood that any number of ring members may be used—the number depending on the relative widths of the spacer, the ring members, and the ring groove of the piston.

What I claim as new and desire to secure by Letters Patent is:

1. A piston packing to be used in a ring groove of a piston and comprising a pair of resilient ring members formed of ribbon steel and adapted to contact the cylinder wall, one of said ring members having a radial thickness substantially less than the depth of said ring groove, a spacer adapted to expand and contract radially and positioned between said ring members and arranged to separate said ring members from each other, said spacer having a rabbet formed therein arranged to receive said ring member whose radial thickness is substantially less than the depth of the ring groove of said piston, an expander positioned in said rabbet between said spacer and said ring member and adapted to exert pressure on said ring member, and an expander positioned between said spacer and the bottom of the ring groove of said piston and adapted to exert pressure on said ring members and said spacer.

2. A piston packing to be used in a ring groove of a piston and comprising a pair of ring members formed of ribbon steel and adapted to contact the cylinder wall, said ring members having a radial thickness substantially less than the depth of said ring groove, a spacer adapted to expand and contract and positioned between said ring members and arranged to separate said ring members from each other, said spacer having formed therein a pair of rabbets adapted to receive said ring members, a ring expander positioned in each of said rabbets between said spacer and said ring members and adapted to exert pressure on said ring members, and a ring expander positioned between said spacer and the bottom of the ring groove of said piston and adapted to exert pressure on said spacer and said ring members.

3. A piston packing to be used in the ring groove of a piston and comprising a spacer adapted to expand and contract radially and having a rabbet formed therein, a pair of resilient ring members adapted to engage the cylinder wall, one of said ring members being of substantially less thickness radially than said ring groove and being positioned in the rabbet formed in said spacer, and a ring expander positioned in the rabbet of said spacer between said spacer and said ring member and adapted to exert radial pressure on said ring member.

4. A piston packing to be used in the ring groove of a piston and comprising a spacer adapted to expand and contract radially and having a rabbet formed therein, a pair of resilient ring members adapted to engage the cylinder wall, one of said ring members being of substantially less thickness radially than said ring groove and being positioned in the rabbet formed in said spacer, a ring expander positioned between said spacer and said ring member and the other of said ring members being thicker radially than said spacer and being adapted to contact the cylinder wall.

5. A piston ring assembly comprising a pair of flat thin ribbon steel cylinder contacting rings of different radial depths, an expansible spacer member disposed between them, said spacer member being recessed on one flat face to provide a seat for the steel ring of less radial depth, the steel ring of greater radial depth being disposed flatwise against the opposite face of said spacer, and an inner expander ring acting on said spacer ring and steel ring of greater radial depth.

6. A piston ring assembly comprising a pair of flat thin ribbon steel cylinder contacting rings of different radial depths, an expansible spacer member disposed between them, said spacer member being recessed on one flat face to provide a seat for the steel ring of less radial depth, the steel ring of greater radial depth being disposed flatwise against the opposite face of said spacer, and an inner expander ring acting on said spacer ring and steel ring of greater radial depth, and a plurality of oil drainage slots extending radially through said spacer member between the flat steel ring contacting surfaces thereof.

7. A piston ring assembly comprising a pair of flat thin ribbon steel cylinder contacting rings of different radial depths and contacting the cylinder wall under different radial tensions, an expansible spacer member disposed between them, said spacer member being recessed on one flat face to provide a seat for the steel ring of less radial depth, the steel ring of greater radial depth being disposed flatwise against the opposite face of said spacer, and an inner expander ring acting on said spacer ring and steel ring of greater radial depth.

8. A piston packing to be used in the ring groove of a piston and comprising a pair of resilient ring members formed of ribbon steel and adapted to contact the cylinder wall, one of said ring members having a radial thickness substantially less than the depth of said ring groove, a spacer positioned between said ring members and arranged to separate said ring members from each other, said spacer having a rabbet formed therein arranged to receive said ring member whose radial thickness is substantially less than the depth of the ring groove of said piston, said other ring member being thicker radially than said spacer and being adapted to contact the cylinder wall, and a sinuous expander positioned between the bottom of said ring groove and said spacer and between the bottom of said ring groove and said ring member thicker radially than said spacer and adapted to exert pressure on said spacer and said member thicker radially than said spacer.

DALLAS M. SMITH.